March 28, 1939. W. STELZER 2,151,998
STEERING BOOSTER
Filed March 15, 1937
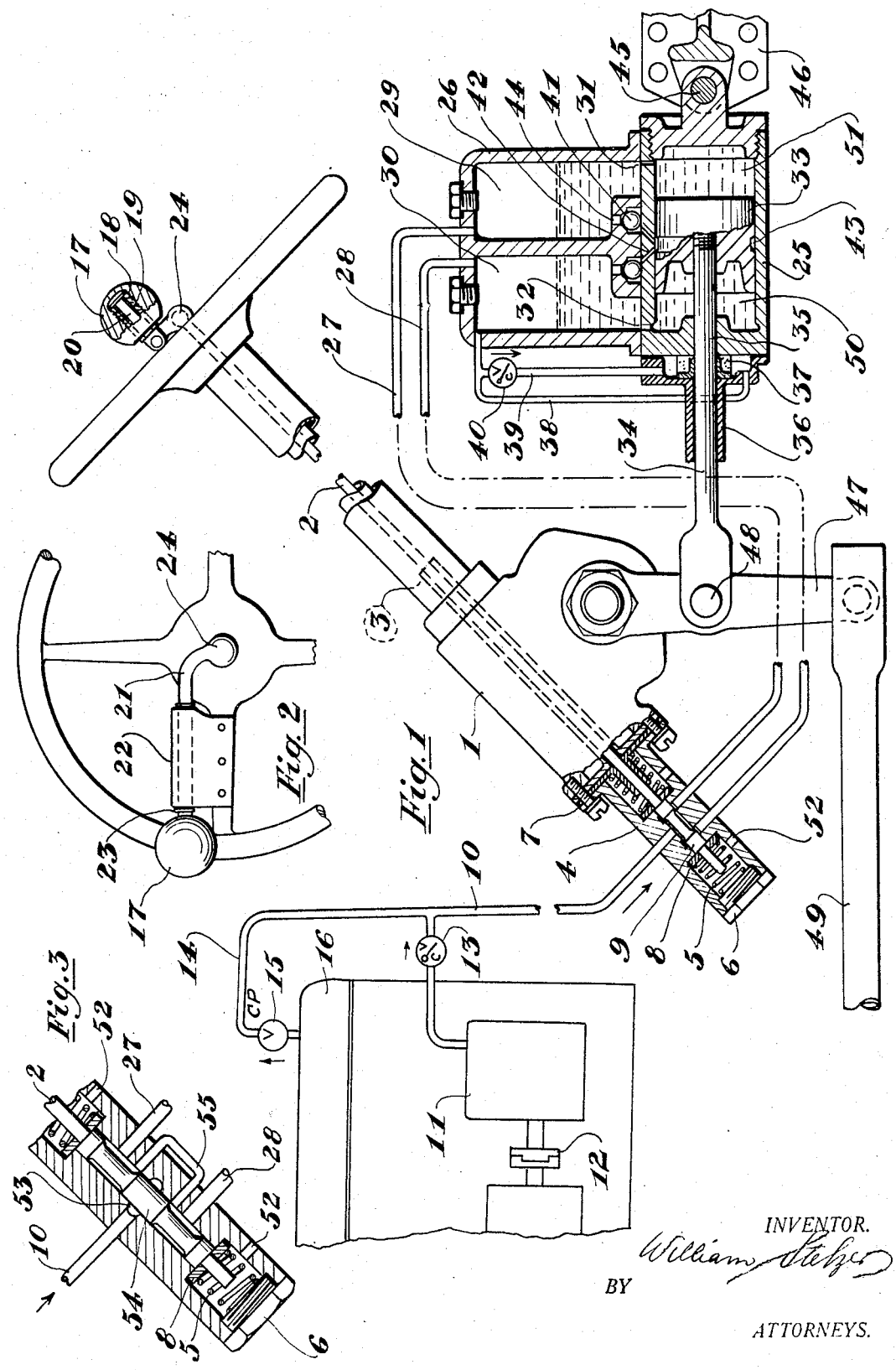
INVENTOR.
William Stelzer
BY
ATTORNEYS.

Patented Mar. 28, 1939

2,151,998

UNITED STATES PATENT OFFICE 2,151,998

STEERING BOOSTER

William Stelzer, Detroit, Mich.

Application March 15, 1937, Serial No. 131,001

14 Claims. (Cl. 180—79.2)

The invention relates to steering mechanisms for automobiles or other vehicles, and more particularly to a booster or servo-mechanism therefor where a certain lost motion between the application point of the manual force and the reduction gear is used to actuate a valve which directs fluid under pressure to one or the other side of a power cylinder or booster which helps to turn the wheels.

The objects of the invention are, first, to obviate the expensive oil pumps used in the present hydraulic steering systems; second, to reduce power consumption by elimination of the constant flow system now in use, and by replacing it with a system using the accumulation of potential energy to reduce the source of power; third, to maintain all the inherent advantages of hydraulic boosters using an incompressible fluid, such as prevention of transmission of road shocks to the steering wheel, and the absence of lag in the application of power, and resultant stability; fourth, to incorporate the advantages of pneumatic systems where energy may be stored for intermittent power consumption, and where small and simple piping may be used without the usual sealing troubles present in hydraulic systems; fifth, to utilize the gas pressure available directly from the engine during combustion; and sixth, to use the reaction of a steering wheel knob mounted pivotally to operate the valve, and thereby eliminating the backlash of the steering wheel relative to the worm wheel caused in present day steering boosters.

These and other objects and features are obtained in a novel construction illustrated in the drawing, wherein:

Fig. 1 is a diagrammatic view of the novel system, the parts being shown as a side elevation, partly in section;

Fig. 2, a fragmentary top view of the steering wheel on a plane perpendicular to the steering column, to show the arrangement of the steering wheel knob and valve operating mechanism; and Fig. 3, a sectional view of a modified form of valve, taking the place of the valve shown in Fig. 1.

The novel device is shown adapted to a conventional steering mechanism 1, where the horn wire is removed (to be mounted elsewhere) and in its stead a valve rod 2 is placed, extending through the horn wire stand pipe 3 inside of the steering shaft, and slidable in a valve housing 4 secured to the lower extremity of the steering gear housing. Said valve housing has its ends counterbored to house centering springs 5 which have a pre-determined increasing build-up and serve to keep the valve in a neutral position as shown. The lower spring is retained by a plug 6, and the upper one by a disc 7 placed intermediate the mounting flange of said valve housing and the disc to which the stand pipe 3 is secured. Both springs act on washers 8 seated on the bottom of the counterbores as well as against the valve plunger 9 which is of the same length as the valve bore, and is part of rod 2 on which said washers are slidable. The latter preferably have square holes, fitting the rod, to prevent turning of the valve plunger relative to the valve housing. To the center of valve 4 leads the pressure line 10 furnishing a supply of compressed air from an air compressor 11 driven through an operable clutch 12, a check valve 13 being interposed as shown, allowing flow in the direction of the arrow only. Line 14 leads through a loaded check valve 15 to the cylinder head 16 of the engine and is in communication with one of the combustion chambers. Said valve 15 is spring loaded to open when the pressure has exceeded the compression pressure, so that no unburnt gases are drawn from the combustion chamber. It is well to place the connection near the spark plug or through it. Pipe 14 must be sufficiently small in diameter to provide a retarded discharge as well as cooling, and line 10 may contain a reservoir. Valve 15 is placed as close to the combustion chamber as possible.

The valve plunger 9 is operated by manipulation of a steering wheel knob 17 adjustably screwed to a sleeve 18 bushed with an antifriction bearing 19 revoluble about a pin or lever 20 rigidly secured to or being a part of a shaft 21 rotatably carried by a bearing or support 22 conveniently mounted to a spoke of the steering wheel. Endwise motion is prevented by snap rings 23. The inner extremity of the shaft is bent and carries a swivel or ball joint 24 engaging said valve rod 2. It is preferable that the swivel joint is of small size or of the antifriction type to minimize the torque on rod 2 from friction.

The power unit or power actuator, consisting of a cylinder 25 and reservoir housing 26, is connected through the latter to the valve housing 4 by means of lines 27 and 28, leading to annular grooves in said valve housing; thus in the neutral position of the valve plunger lines 27 and 28 are in communication with each other through said annular grooves and the space produced by the recessed central portion of valve plunger 9.

Thus they are also in communication with the pressure line 10. The reservoirs 29 and 30 communicate with the chambers in cylinder 25 through restricted orifices 31 and 32, respectively, so that the ends of the piston 33 are under pressure when valve 9 is in neutral position. The piston rod 34 of said piston is guided in a lapped bearing 35 and protected by a sleeve or cover 36 retaining an oil seal 37. Since leakage of oil past said bearing 35 cannot be prevented, an automatic return feed is provided in a line 38 from the sump of said cover to chamber or cylinder 30; a second line 39 with a check valve 40 leads to the upper space of the sump chamber. Whenever the pressure in chamber 30 decreases, the expanding gas in line 39 due to the closed check valve 40 forces the oil from said sump back into chamber 30. Line 38 must be of small capacity.

Another feature to be described on this mechanism is the means to maintain the same fluid level in neutral (straight forward) position in both reservoirs, as without it the fluid might work itself into one reservoir due to leakage past the piston and thereby allow air into the cylinder, which would disturb the proper operation. The construction for the aforesaid purpose consists of a pair of check valves 41 in the shape of balls resting on the machined flat surface of the cylinder so as to leave a small clearance space between the seat above them. Diagonal holes 42 communicate between the space surrounding said balls and an annular groove 43 on the piston. Thus with the piston in neutral position and the pressure equalized in both reservoirs a passage is established from one reservoir chamber to the other through valve holes 44, diagonal holes 42, and groove 43. If the pressure is unequal, one of the check valves closes and the passage is interrupted; it is also interrupted as soon as the piston leaves the neutral position.

The power unit is pivoted at 45 to a bracket 46 riveted to the chassis frame or other structural member of the automobile, to which the steering mechanism 1 is also secured, and operates the pitman arm 47 through a pivot at 48. The lower extremity of said pitman arm actuates the drag link 49 in the usual manner, which is operatively connected with the steering arm. Since the effective area of chamber 50 is slightly smaller than that of chamber 51 due to the displacement of the piston rod, a spring may be placed in chamber 51 acting against the piston to compensate for the difference. It is not shown in the drawing because the difference is not great enough to be of consequence.

For operation, the power unit is filled to a sufficiently high level with a non-compressible fluid, such as lubricating oil or brake fluid, so that in any position of the piston no air is admitted into the power cylinder. In the neutral position, as shown on the drawing, and corresponding to straight forward position of the steering gear, the entire system is under pressure. No energy is taken from the engine or air compressor to maintain the pressure, except to make up for a small leakage in the operating value. No force is applied to the piston rod because the pressures are balanced, except for a slight difference due to the area of the piston rod. Suppose now that the operator starts to make a right turn, applying his hand to the steering wheel knob 17. If the resistance is not excessive, the knob does not move relative to the steering wheel rim as the upper spring 5 is not overcome. But if the resistance increases, valve rod 2 is lifted and the upper spring 5 compressed. The valve plunger 9 shuts off line 28 from the pressure line 10 and exposes it to the atmosphere so that compressed gas from reservoir 30 may escape through vent 52. The amount of the escaping gas is proportional to the boosting force required, because as soon as the pressure difference in chambers 50 and 51 is great enough to move the piston, the steering wheel follows up and the valve plunger 9 is checked in its movement or returned, which is the characteristic of any follow-up valve. When the wheels have turned sufficiently and the operator eases the force on the knob, the centering spring 5 returns the valve plunger to its neutral position, whereby the whole system becomes balanced again. Turning to the left, the operation is opposite. For conventional linkage, the drawing shows the construction connected for right hand drive; for left hand drive lines 27 and 28 should be reversed.

In order that the power unit of power actuator does not have to be under maximum pressure all the time, I provide a modified valve shown in Fig. 3, taking the place of valve 4. It is shown in the neutral position and the pressure line 10 leading into the annular groove 53 is shut off by the central portion 54 of the valve plunger. A passage 55, which in construction may be drilled within the valve housing, short circuits lines 27 and 28 so that the pressures in the different chambers of the power unit are balanced. The springs 5 are so constructed that they have a rapid build-up after reaching a compression where the valve plunger opens up to the atmosphere. Such a characteristic can be obtained by winding the springs with a variable pitch so that certain coils bottom when said valve plunger has reached the position where it opens up the passage. The same may be accomplished by using a second set of shorter and stiffer springs placed inside said other springs, to be compressed after the plunger has traveled to the critical point.

In operation in the aforementioned manner, the modified valve first closes the by-pass passage 55 and then opens one line of 27 and 28 to the atmosphere, admitting pressure to the other. The compressed gas fed to the power unit, after the valve has returned to neutral, is not discharged, but merely equalized, so that its potential energy may be preserved for the next power application.

It is obvious that the device may be operated with a non-compressible fluid exclusively, and it may be used not only for automotive steering but for other similar or related operations as well. However the use of a non-compressible fluid such as lubricating oil in the power actuator or power cylinder, and a compressible fluid such as air or exhaust gases in the control or primary system is preferred. Other modifications and variations may be resorted to within the scope of the invention, as here claimed.

I claim:

1. In a steering booster, a hydraulic power actuator, incompressible fluid in said power actuator, enclosed incompressible fluid exterior of said hydraulic power actuator in communication therewith through restricted passages, and a source of gaseous fluid under pressure to operate said hydraulic power actuator pneumatically outside of said hydraulic power actuator, the application of said gaseous fluid being controlled by the relative movement between the point of application of the manual force of the operator and the steering linkage due to the yield of a resilient member, whereby said movement is transmitted to operate a follow-up valve.

2. In a steering booster, a hydraulic power actuator to provide a servo-action for steering, an enclosed incompressible fluid in communication with said power actuator, a source of gaseous compressed fluid, a follow-up valve actuated by a yielding movement of the point of application of the manual force and the steering mechanism, and lines from said follow-up valve to said source of gaseous compressed fluid and to the enclosed incompressible fluid, said follow-up valve directing the compressed gaseous fluid to act on the enclosed incompressible fluid to operate the hydraulic power actuator when the exertion of the manual force reaches a certain value.

3. In a booster for a steering mechanism, a hydraulic power actuator comprising a cylinder, a piston therein operatively connected with the steering mechanism, said piston dividing said cylinder into two chambers, incompressible fluid in said chambers, reservoirs partly filled with incompressible fluid above said cylinder, one of said chambers having a restricted passage leading to one of said reservoirs, and the other chamber having a restricted passage to another reservoir, a source of gaseous fluid under pressure, a follow-up valve, a feed line from said source of gaseous fluid to said follow-up valve, resilient members to hold said follow-up valve in neutral position, passages from said follow-up valve to said reservoirs, said follow-up valve being so arranged that it provides communication between the reservoirs when in neutral position, and means to use part of the manual turning force exerted by the operator in turning the steering wheel to actuate said follow-up valve, said follow-up valve being so constructed that when in the extreme position, one reservoir is in communication with the atmosphere and the other reservoir with the source of gaseous compressed fluid, to actuate said power actuator in the proper direction to boost the steering force.

4. The construction as claimed in claim 3, with means to maintain the same hydraulic level in said reservoirs when the piston is in neutral position corresponding to straight forward steering.

5. The construction as claimed in claim 3, with means to feed hydraulic fluid that has leaked from the power actuator, back to one of the reservoirs.

6. The construction as claimed in claim 3, where the said follow-up valve is so constructed that the source of gaseous fluid is in communication with said reservoirs when said valve is in neutral position.

7. The construction as claimed in claim 3, where the source of compressed gaseous fluid and the atmosphere are shut off from the reservoirs when the valve is in neutral position.

8. The construction as claimed in claim 3, where the said source of compressed gaseous fluid consists of an internal combustion engine where a connection from the follow-up valve leads to a combustion chamber of said engine, with a check valve interposed in said connection, said check valve being spring loaded to open at a pressure above the pressure of compression before combustion, and to allow flow in the direction towards said follow-up valve only.

9. The construction as claimed in claim 3, where the reaction of a steering wheel knob is used to operate said follow-up valve.

10. In a steering mechanism, a fluid operated booster operatively connected to said steering mechanism, a pressure source, hydraulic connections between said pressure source and said power booster, follow-up valve means to control said power booster, a knob mounted to the steering wheel in such a way that it may yield relative to said steering wheel, and means to use the relative movement due to the yield to operate said follow-up valve.

11. In a steering booster in conjunction with a mechanical steering gear for automobiles, a power actuator, incompressible fluid in said power actuator, connecting means between said power actuator and the steering members of said mechanical steering gear, a source of compressed gaseous fluid, follow-up valve means to selectively direct fluid under pressure from said source of compressed gaseous fluid to act on said power actuator to boost the steering force, hydraulic seals consisting of incompressible fluid between said incompressible fluid in said power actuator and said gaseous fluid, restricted passages between said hydraulic seals and said fluid in said power actuator to provide a damping action to prevent road shocks, and means to utilize the yielding movement of a member, to which the manual steering force is applied, to operate said follow-up valve means to boost the steering force.

12. The construction as claimed in claim 11, where the steering mechanism may be operated independently of the steering booster, substantially as described.

13. The construction as claimed in claim 11, with an additional steering member, besides the usual steering wheel, constructed to allow a relative movement between said additional steering member and the usual steering wheel, said relative movement to be used to operate said follow-up valve, substantially as described.

14. The construction as claimed in claim 3, where said feed line from the source of gaseous pressure to said follow-up valve is provided with a check valve close to the source of gaseous pressure, so that said feed line serves as a small reservoir.

WILLIAM STELZER.